Aug. 21, 1923.
H. CONRADI
1,465,297
MACHINE FOR MAKING STRUCTURES CENTRIFUGALLY
Filed Jan. 3, 1923
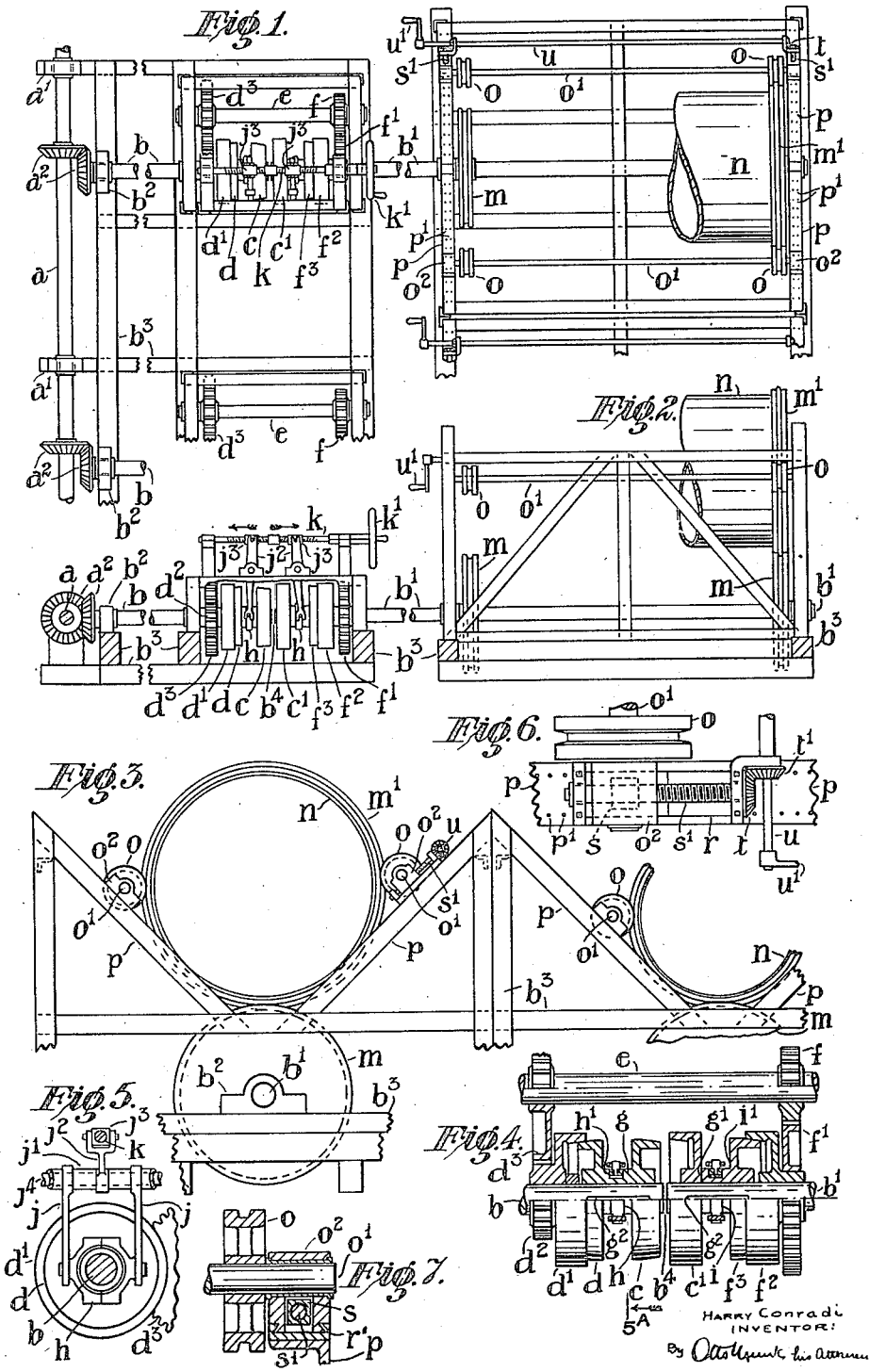
HARRY Conradi
INVENTOR Patented Aug. 21, 1923.

1,465,297

UNITED STATES PATENT OFFICE.

HARRY CONRADI, OF TOORAK, VICTORIA, AUSTRALIA.

MACHINE FOR MAKING STRUCTURES CENTRIFUGALLY.

Application filed January 3, 1923. Serial No. 610,418.

*To all whom it may concern:*

Be it known that I, HARRY CONRADI, a subject of the King of Great Britain and Ireland, residing at 1a Woodside Crescent, Toorak, in the State of Victoria, Commonwealth of Australia, have invented certain new and useful Improvements in Machines for Making Structures Centrifugally; and I do hereby declare the following to be a full, clear, and exact description of the invention, such as will enable others skilled in the art to which it appertains to make and use the same.

My invention provides compact mechanism for the manufacture of articles of plastic material by a series of centrifugal moulding machines, each of which can be started, operated, varied in speed, regulated to conditions of work, and stopped independently.

To explain my improvements I now refer to the accompanying drawings, in which the scales differ, and which are in parts diagrammatic.

In this specification the terms "vertical" and "horizontal" include approximations.

Figure 1 is a plan of a moulding machine, and part of the driving mechanism of another.

Figure 2 is a side elevation of the machine shown in Figure 1.

Figure 3 is an end view showing a moulding machine, and part of another.

Figure 4 is a partly sectional plan showing parts of the speed changing and clutch mechanism of a machine.

Figure 5 is a sectional end view on line 5A of Figure 4.

Figure 6 is a plan of portion of a guard roller device.

Figure 7 is a sectional view of Figure 6 through the guard roller.

My invention does not relate to any particular form of mould and the objects to be made may vary, and may include reinforcement. As an example of moulds which are usable, I illustrate two, and in Figure 3 one is of longer diameter than the other.

To enable the mould to be driven it has external means, as bands or flanges, suitably spaced apart. The position of the wheels which I use to rotate the mould is important, as also the locations of my mould position regulators, or guard rollers.

A main shaft $a$ is supported in bearings, $a^1$, and at each of a series of convenient points along the shaft, a counter shaft $b$ is adapted to be driven through bevel gearing $a^2$. Each counter shaft is connectible to the drive shaft $b^1$ of a centrifugal moulding machine, the shafts $b$, $b^1$ being supported in bearings $b^2$, on a frame $b^3$, and having between them a gap $b^4$. The shaft $b$ can be geared to drive shaft $b^1$ at its own speed, but I provide for changing the rate of rotation of shaft $b^1$. Thus I employ a clutch mechanism the lower part of which is shown clearly in Figure 4, the upper part being shown in Figure 2. In this mechanism a shaft $e$ carries a gear wheel $d^3$, which meshes with a pinion $d^2$, which is rotatable on shaft $b$. Shaft $e$ also carries a pinion $f$ which meshes with a gear wheel $f^1$ which is rotatable on shaft $b^1$. To provide that the centrifugal machine shall have two working speeds, one slow, the other fast, gear wheel ratios will be determined accordingly. The drawings show mechanism for two such speeds. I may make any gear wheels removable at will to allow of varying the working speeds. In the mechanism illustrated a flanged clutch disc $d^1$, is fixed to pinion $d^2$ and a flanged clutch disc $f^2$ is fixed to gear wheel $f^1$.

Slidable on shaft $b$ is a clutch member which contains oppositely directed flanged discs $c$, $d^1$ united by a hub $g$; and shaft $b^1$ carries a similar slidable clutch member containing oppositely directed flanged discs $c^1$, $f^3$ united by a hub $g^1$. Each hub is engaged by means which will slide the two clutch members each along its shaft simultaneously to or from one another, according to whether high or low speed is to be applied to shaft $b^1$. Thus each hub $g$, $g^1$ has around it a recess $h^1$, $i^1$, a split collar $h$, $i$, entering each recess, and being engaged by the arms $j$ of a lever having a boss $j^1$ which is suitably pivoted as on a support $j^4$. The lever has an arm $j^2$ having its end forked, the limbs of the latter being slotted and engaged with pins projecting from a nut $j^3$ mounted on a rod $k$ which is supported on the frame. This rod has right hand and left hand screw threads which the respective nuts $j^3$ engage; and the said rod is adapted to be rotated by means of a hand wheel $k^1$. The speed of rotation of shaft $b^1$, and therefore of its machine, is regulated by operation of hand wheel $k^1$; and by the latter also any machine can be stopped independently of other machines.

In Figure 4 the shaft $b^1$ is geared to rotate at a low speed, but to change to higher speed the handle $k^1$ is rotated rapidly, moving the nuts $j^3$ farther apart, and moving the lever arms $j$ so that they slide the hubs $g$, $g^1$ and the clutch members $c$ and $c^1$ therewith towards one another till the parts $c$ and $c^1$ engage. But if stoppage of rotation is desired the clutch members will be moved only to intermediate positions, by setting clutch members $d$, $c$, and $f^3$ in disengaged positions, by means of hand wheel $k^1$.

My mould driving wheels are marked $m$. The centre of each is vertically below the longitudinal axis of a mould $n$; mould bands or flanges are marked $m^1$. I provide mould position regulators at each side of each mould. These regulators are adjustable guard rollers $o$; and they can be adjusted as found desirable; but an important position provided for is with the centre of each roller and the centre of the intermediate mould all in one horizontal plane during the centrifugal action. I may set one or more guard rollers slightly above the horizontal diameter of a mould, to prevent or limit upward rise of a mould.

By adjusting bearings $o^2$ and thus rollers $o$, the latter will be set to act as abutments for moulds of different diameters, a relatively small mould being shown at the right side of Figure 3. Various means of roller adjustment are usable; rollers $o$ have axles $o^1$ in adjustable bearings $o^2$ on beams $p$ of the machine frame. These beams diverge upwardly. They have fixing means, shown as holes $p^1$ for bolts which fix the adjustable bearings where desired.

I use also, however, in some cases screw adjustment bearing devices, as shown clearly in Figures 6 and 7, where the bearings are slidable on guides $r$ which are secured to beams $p$ as by bolts entering convenient holes $p^1$. Each bearing $o^2$ carries a nut $s$, on a screw threaded bolt or spindle $s^1$, which is supported by brackets on a base $r^1$. The spindle $s^1$ carries a gear wheel $t$, meshing with a pinion $t^1$ on a rod $u$ having a handle $u^1$, by which to rotate rod $u$, and thus spindle $s^1$ and adjust the bearing.

Easy removal of moulds at will is practicable, because by rotating the handle $u^1$ clear space will be produced between the guard roller $o$ of that bearing and the mould.

It is not essential during centrifugal action that the mould should always have every guard roller in frictional contact with it. There may be at times clear space at one or more rollers.

The diverging beams $p$ may be more upright than is illustrated; and are not necessarily made with plane surfaces, but may have surfaces which curve.

I claim:—

1. For the manufacture centrifugally of bodies by the use of plastic material, a machine having a mould, frictional driving wheels to rotate and support the mould and having their centres vertically below the mould axis, and guard rollers at the sides of the mould, the guard roller centres and the mould axis being in a horizontal plane, the guard rollers being adjustable.

2. The construction set forth in claim 1, but in which the guard rollers are supported by bearings located on frame members which diverge upwardly.

3. The construction set forth in claim 1, but in which a guard roller has its axle supported in a bearing member which, by means of a screw bolt, is movable upon a base, the said base being adjustable upon machine framing.

4. The construction set forth in claim 1, but in which a guard roller has its axle supported in a bearing member which, by means of a screw bolt, is movable upon a base, the said base being adjustable upon machine framing, the screw bolt being actuated by bevel gear, the machine framing having holes for attachment of the said base.

5. In a centrifugal machine for manufacturing products by the use of plastic material, mould bands which rest upon driving wheels having their centres vertically under the band centres, and mould side guards which contain rollers, and are adjustable on frame members which diverge outward upwardly.

6. The construction set forth in claim 5, but with the members of the frame which support the bearings extending obliquely.

In witness whereof I have hereunto set my hand.

HARRY CONRADI.

Witness:
GEORGE G. TURRI.